June 14, 1932. F. SCHOUTEN 1,862,864
CENTRIFUGAL FLEXIBLE COUPLING
Filed Feb. 19, 1930 2 Sheets-Sheet 1
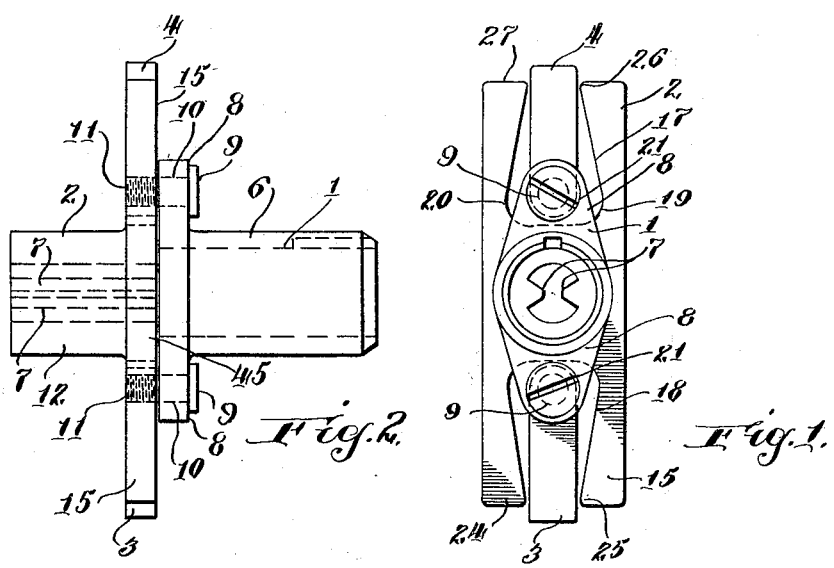
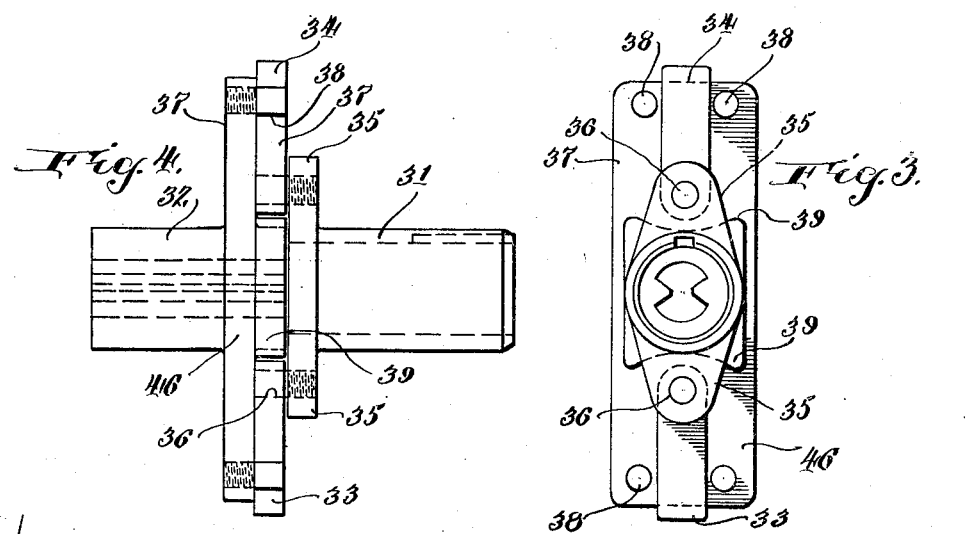
Inventor
Frank Schouten
By Edwin Hammek
Attorney

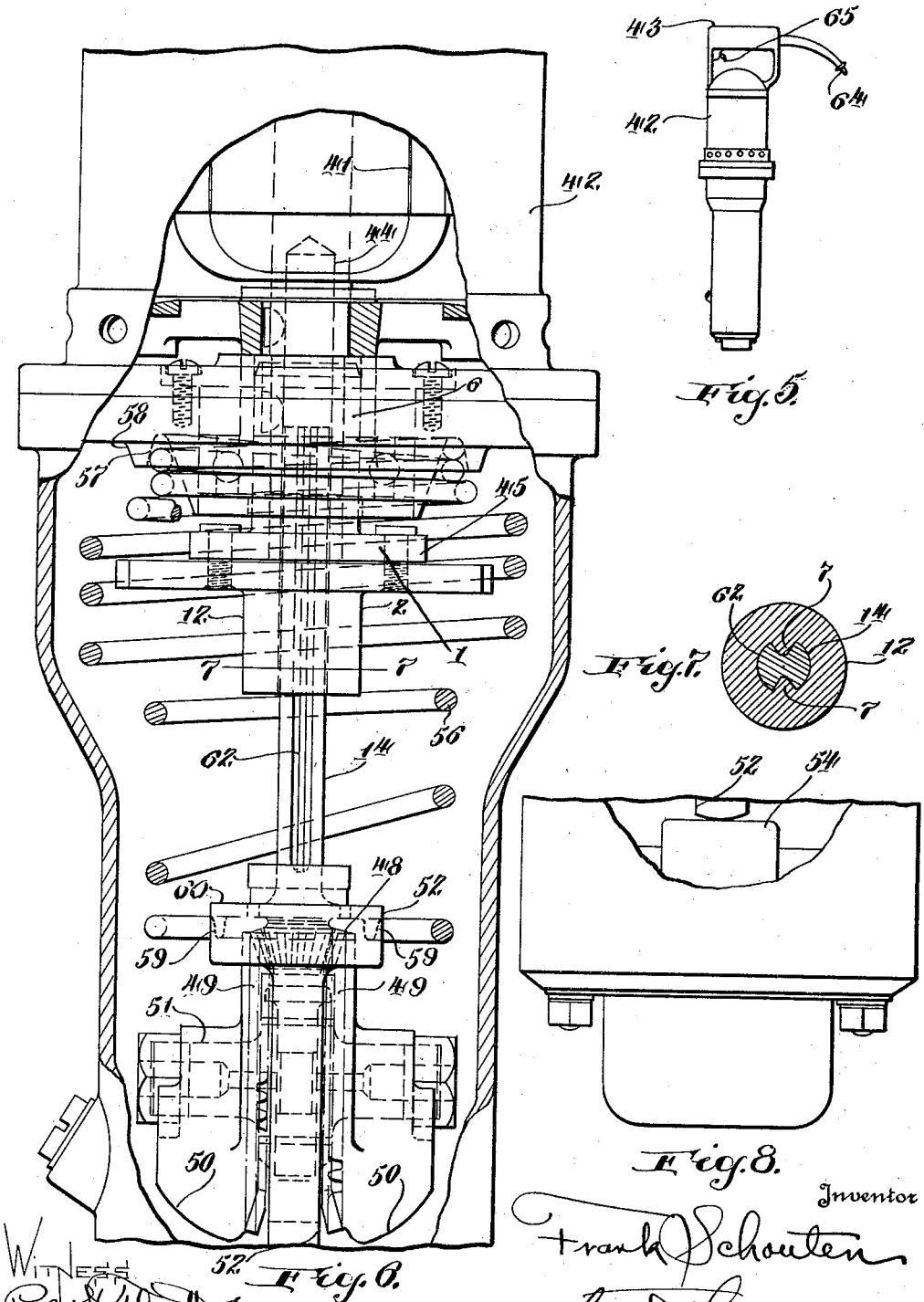

Patented June 14, 1932

1,862,864

UNITED STATES PATENT OFFICE

FRANK SCHOUTEN, OF GLEN ARM, MARYLAND, ASSIGNOR TO THE BLACK & DECKER MANUFACTURING COMPANY, OF TOWSON, MARYLAND, A CORPORATION OF MARYLAND

CENTRIFUGAL FLEXIBLE COUPLING

Application filed February 19, 1930. Serial No. 429,502.

In the operation of portable electric tools, particularly those of the percussive or hammer type, but to an almost equal extent with nut setters or wrenches and screw drivers, and to a greater or less extent with taps and drills, the shock to the motor incident to the vibration of the hammer and to the stopping of the rotary tools by increased resistance when the nuts, screws and/or bolts are set, and to the reversing of the taps and the irregularities of the material, communicate backward through the mechanism to the motor, the joints, keys and shafts, shocks which when multiplied by the thousands, in which the shocks occur during an extended term of use of the tool, have a most harmful effect on the motors and other machine parts referred to, shortening the life of the motor and tool to a considerable extent.

Numerous flexible connections have been devised for reducing the shocks thus transmitted, but the bulk of these involve the use of springs or other cushions, the life of which under the severe usage to which they are thus put is extremely limited and other types dependent upon the centrifugal action of weights are heavy, elaborate and expensive, and the majority of them are not sufficiently sensitive to operate efficiently in attaining the desired result.

The present invention relates to a flexible coupling or shock absorbing device for use in motor driven tools, particularly portable electric tools of the type described, but capable of more general application. This device is of extreme sensitiveness, affording the maximum of protection to the motor and machine parts and of such simple construction that it can be provided at the minimum of cost and further on account of its simple construction, its operative life is longer than that of other devices provided for this purpose.

In the accompanying drawings, I have illustrated a centrifugal flexible coupling or shock absorbing device embodying the features of the invention, together with so much of a portable power driven electric hammer to which the device is applied as is necessary to illustrate the manner of operating, applying and using the device of the invention.

In the drawings:

Figure 1 is a view in the nature of a plan looking at the coupling from what would normally be regarded as the top side, i. e., the side of the driving member.

Figure 2 is an elevation looking at the coupling from the left of the observer, as it is seen in Figure 1.

Figure 3 is a view corresponding to Figure 1 showing the coupling in a slightly modified form.

Figure 4 is a view of this modified construction looking at the coupling from the left as seen in Figure 3.

Figure 5 is an external view of an electric hammer on a reduced scale.

Figure 6 is a fragmentary view of the same, the casing being broken away to show the internal construction in section on a plane extending through the axis of rotation of the motor.

Figure 7 is a section on the line 7—7 of Figure 6.

Figure 8 is a fragmentary view of the lower end of the hammer.

Referring to the drawings by numerals, each of which is used to indicate the same or similar parts in the different figures, the flexible coupling construction, shown in Figures 1 and 2, comprises a driving member 1, a driven member 2, and two centrifugal swinging arms 3, 4. More specifically described, the driving member 1 also includes oppositely projecting lugs or flanges 8—8 at right angles to said axis of rotation. The pivot pins 9—9 have a free running fit in suitable bearing apertures 10—10 in the lugs 8 and project therefrom to the left in the direction of the driven member 2, i. e., to the observer's left in Figure 2.

These projecting ends are preferably threaded as shown or otherwise provided with suitable fastening means by which the centrifugal arms 3—4 are secured to the pins which serve as pivots for the arms upon which they swing relatively to the driven member 1 about bearings 10, being controlled by the speed of rotation, centrifugal force, the inertia of the arms and the load as hereinafter described.

The centrifugal arms 3—4 as shown are straight elongated members suitably apertured and threaded at 11 to receive the bearing ends of the pivot pins 9 as aforesaid.

The driven member 2 comprises a hub or boss 12 apertured to receive the driven shaft and preferably provided with integral inwardly projecting keys 7—7, whereby the driven member 2 is connected to the driven shaft 14, see Figure 6, to be later described. The driven member 2 also comprises an elongated plate or flange 15 at right angles to the axis and located at the end of the boss 12, which is at the observer's right in Figure 2 or toward the driving member. This plate or flange 15 is slotted on opposite sides of the axis of the two hubs or bosses 6, 12, which are in alignment, though the exact arrangement of these slots is not vital. The function of the slots is to enclose the centrifugal arms 3—4, which oscillate therein to control the relative position of the driving and driven members 1 and 2.

In the form of the invention shown, these slots 17—18 are tapered, the small end of the taper being at the outer ends of the plate 15. The width of the slots at this point is slightly greater than the width of the corresponding arms 3—4, the slots and arms being preferably symmetrical about the axis of rotation. The inner or larger ends of the slots are shown as of a width almost twice the width of the centrifugal arms 3—4, being formed with abutments or pockets 19—20, shown as conforming to the corresponding ends 21 of the centrifugal arms. The inner ends of the arms 3, 4, are seated in the pockets 19, 20, in the extreme accelerating and retarding positions of the coupling. At this time the inner end of the arm mentioned acts against the pockets 19, 20 in the manner of a roller or boss mounted on the corresponding pivot pin 9, being preferably rounded for this purpose. These pockets 19, 20, act as inner abutments.

The centrifugal arms 3, 4, are restrained in a tangential direction in their motion relatively to the driven member 2, by the corners or outer abutments 24, 25, 26, 27 on each side of the slots 17, 18 at their outer ends, which corners are more or less rounded or flattened to meet the requirements of the trade and the views of the designer.

In the modified form of flexible coupling shown in Figures 3, 4, the driving member 31 corresponds to driving member 1, driven member 32 to driven member 2, arms 33, 34 to arms 3, 4 and the lugs 35 on the driving member 31 correspond to the lugs 8 in Figures 1 and 2. The arms 34 are pivotally mounted on these lugs on pivot pins 36 and the driven member 32 is provided with an elongated projecting plate or flange 37 corresponding to the plate or flange 15 of the driven member 2.

The second form which is being described differs from the form illustrated in Figures 1 and 2 in that the outer corners 24, 25, 26, 27 at each side of the entrance to the slots 17, 18, which control the arms 34, are replaced by the pins 38 located and spaced similarly to the said corners 24, 25, 26, 27. The abutments or pockets 19, 20 are replaced by correspondingly located abutments 39, the pins 38 and abutments 39 being mounted on or secured to the plate or flange 37 of the driven member 32, which corresponds to the plate or flange 15 of the structure shown in Figures 1 and 2, and these members 38, 39 serve exactly the same functions as do the corresponding features, i. e., the corners or outer abutments 24, 25, 26, 27 and the pockets or inner abutments 19, 20 of Figures 1 and 2.

In Figures 5, 6, 7, 8 I have illustrated an electric hammer equipped with a flexible coupling embodying the features of the invention. This construction comprises an electric or equivalent motor 41 enclosed in a casing or motor housing 42, having a grip 43. The motor shaft 44 is connected by means of the flexible coupling 45 or 46 to the pinion shaft 14 which carries bevel pinion 48 meshing with bevel gears 49. These gears 49 carry eccentric weights 50 and rotate on suitable journals 51 carried by the spider 52 to which vibrations are imparted by the rotation of the centrifugal weights. These vibrations are transmitted to the anvil 54 by which the vibrations or impacts are transmitted to a suitable tool not shown.

The spider 52 is restrained from rotation with the shaft 14 by means of a spring 56, which is seated in and engages a groove 57 in the stationary member 58 and a groove 59 in the head 60 of the spider. This spring holds the spider normally in contact with the anvil.

It will be noted that the shaft 14 is grooved longitudinally at 62 at diametrically opposite points though the exact relation of these grooves is not important except to the extent that it must conform to the position of the keys 7, and this shaft is mounted to slide in the hub or boss 12 of the driven member 2, the hub 6 of the driving member being connected to the motor shaft 44 as shown. The keys 7 of said driven member slide in the grooves 62 in the shaft as the spider vibrates as aforesaid.

In the operation of the hammer, the motor 41 being energized in any suitable manner as by current supplied by way of the cord 64, controlled by the trigger switch 65, motor shaft 44, which is secured to the hub or boss 6 of the driving member 1, of the centrifugal coupling 45, drives the shaft 14 through the coupling 45 and this shaft drives the large bevelled gears 49 by way of the pinion 48 imparting to them a rotative motion of equal speed in opposite directions, the weight being timed to ascend and descend simultaneously on opposite sides of the spider. The tendency to rotation of the spider 52 is resisted by the action of the spring 56 which holds the spider in contact with the anvil and as aforesaid is seated at one end in a groove in the frame at 57, and at the other end in a groove 59 in the spider head.

The rotation of the gears with the weights 50 carried thereby establishes and maintains a vibratory action of the gears 49, weights 50 and the spider 52 by which they are carried and the vibrations of the spider are in turn communicated to the anvil 54 and hence to the work in a well known manner. During this operation the shaft 14 moves up and down in the hub or boss 12 of the driven member 2 of coupling 45, the keys 7 in said hub sliding in slots 62 in the shaft 14.

The invention has particular reference to the centrifugal flexible coupling, the function of which is to protect the motor and other parts by absorbing and reducing the shocks or vibrations incident to the impact of the blows and the eccentricity of the weights.

In the operation of the machine, when the motor is started and the torque of the motor is thus applied to the driving member 1 to rotate it in either direction, the normal operation of the machine being in right handed rotation, the driving and driven members 1 and 2, will have the maximum relative angular displacement and the inner ends of the arms 3, 4 at 21, where they surround the pivot pins 9, will rest against the pockets or abutments 19, 20, Figures 1 and 2, at the inner ends of the slots or recesses, 17, 18. As the speed of rotation increases, the arms 3, 4 will be acted upon by centrifugal force which tends to force them to a radial position. This action or tendency causes the arms to bear against the points 24, 26, at the outer ends of the recesses or slots 17, 18, whereby they are thrown out of contact with the abutments or pockets 19, 20, on the corresponding sides of the wide inner ends of these slots or recesses 17, 18. The rotative tendency is communicated from the driving member 1 to the driven member 2 in the low speed position of the parts by the pressure of the inner ends of the centrifugal arms 3, 4, against the abutments or sides of the recesses 17, 18 at 19, 20. As the speed of rotation increases and the arms 3, 4 tend to straighten by centrifugal force to a radial position, these arms bear against the corners or outer abutments 24, 26 in right handed rotation and the corners or outer abutments 25, 27 in left handed rotation. The load is thus taken from the inner abutments or pockets 19, 20, and transferred to the corresponding outer abutments or corners 24, 26.

A position of equilibrium is attained when the torque demanded by the load through the driven member 2 is balanced at the points 24, 26, or 25, 27, by the tangential component of the centrifugal force acting upon the arms 3, 4, and any sudden change in torque taken, i. e., load or vibration transmitted from the driven side or by sudden increase or decrease of the power, is accompanied by a change in the angular displacement of the driving member 1 in relation to the driven member 2, and a consequent increase or decrease of the tangential component of the force due to centrifugal action of the arms 3, 4.

In other words, the tangential component of the centrifugal tendency of the arms 3, 4 in the position of equilibrium, i. e. under normal driving conditions transmits the torque from the driving to the driven member and all shocks or changes of torque transmitted through the coupling result in corresponding changes of angular displacement between the driving and driven members absorbing completely the shocks due to such changes. The parts are so designed, i. e., the weight and length of the arms are so related to the normal speed of rotation as to establish this condition of equilibrium in the normal operation of the tool.

In the modified construction, Figures 3, 4, the plate 37 of the driven member 32 corresponds to the plate 15 of the driven member 2 in Figures 1 and 2, and the pins 38 or outer abutments correspond to and serve the functions of the outer abutments or corners 24, 25, 26, 27 at the mouths or outer ends of the recesses or slots 18 in the driven plate 15 and the inner abutments 39 in the form shown in Figures 3, 4, correspond to the abutments or pockets 19, 20 at each side of the wide inner ends of the recesses or slots 17, 18, so that the operation of the second form shown in Figures 3 and 4, is identical with that described.

I have thus described specifically and in detail a coupling and a portable electric hammer to which the coupling is applied specifically and in detail in order that the manner of constructing, operating, applying and using the invention may be fully understood, however, the specific terms herein are used descriptively rather than in a limiting sense, the scope of the invention being defined in the claims.

What I claim as new and desire to secure by Letters Patent is:

1. The combination in a centrifugal flexible coupling of driving and driven members substantially in axial alignment and means connecting the driving and driven members comprising centrifugal arms on the driving member and spaced abutments on the driven member enclosing said arms, part of said abutments being adjacent the outer ends of the arms and spaced slightly more than the width of the arms and part of said abutments being adjacent the inner ends of said arms and spaced to provide angular play of said members, the torque of the load being normally balanced by the tangential component of the centrifugal force of the arms applied at said outer abutments.

2. A centrifugal flexible coupling comprising a driving and a driven member, a centrifugal arm pivoted on one said member, an abutment on the other said member engaging the centrifugal arm near its outer end whereby the centrifugal arm transmits the driving torque from the driving to the driven member, the tangential component of the centrifugal force acting upon the arm applied at this point serving to balance the torque of the load, and means for transmitting the torque direct from the driving to the driven member in starting and at less than normal speeds, said means providing for a limited relative displacement of said members.

3. The combination in a centrifugal flexible coupling of driving and driven members substantially in axial alignment, the driving member having pivotally mounted swinging centrifugal arms mounted thereon, and the driven member having means extending outwardly substantially to the outer ends of said arms when in radial position, said means being formed with an enclosure for each said arm, said enclosure being at its outer extremity of a width slightly in excess of the arms and at its inner extremity of a width considerably in excess of the corresponding width of the arm.

4. The combination in a centrifugal flexible coupling of driving and driven members substantially in axial alignment, the driving member having pivotally mounted swinging centrifugal arms mounted thereon, and the driven member having means extending outwardly substantially to the outer ends of said arms when in radial position, said means being formed with an enclosure for each said arm, said enclosure being at its outer extremity of a width slightly in excess of the corresponding width of the arms, providing outer abutments near the outer end of the arm but slightly spaced from the arms in radial position, and inner abutments spaced on each side of the pivot by a considerably greater angularity.

5. The combination in a centrifugal flexible coupling of driving and driven members, the driving member being provided with oppositely located pivotally mounted centrifugal arms adapted to swing to and through radial positions, the driven member having a radially extending portion slotted in a radial direction providing a slot to enclose each said arm, the arms being located in said slots which are formed to provide limited play to the driving relative to the driven member, the arms being adapted to bear on the walls of the slots near their outer extremity to transfer the driving torque when the tangential component of the centrifugal force acting on the arms equals and balances the torque of the load, the inner ends of the slots providing spaced abutments permitting greater play in starting and with excess loads.

6. The combination in a centrifugal flexible coupling of driving and driven members, the driving member being provided with oppositely located pivotally mounted centrifugal arms adapted to swing to and through radial positions, the driven member having a radially extending portion slotted in a radial direction providing a slot to enclose each of said arms, said arms being located in said slots which are formed to provide limited play to the driving relative to the driven member, the walls of said slots converging outwardly from the center of rotation, providing outer abutments slightly spaced on each side of the arms and inner abutments spaced on each side of the pivots about which the arms swing by considerably greater distance.

Signed by me at Towson, Baltimore County, Maryland, this 12th day of February, 1930.

FRANK SCHOUTEN.